United States Patent
Koeszegi et al.

(10) Patent No.: US 12,046,948 B2
(45) Date of Patent: Jul. 23, 2024

(54) SECURING OF STATOR SEGMENTS

(71) Applicant: Flender GmbH, Bocholt (DE)

(72) Inventors: Attila Koeszegi, Kanjiza (RS); Andreas Lindmeier, Ruhstorf (DE); Dominik Ratzisberger, Kösslarn (DE); Franz Xaver Michael Schober, Neukirchen vorm Wald (DE); Christoph Schwarzbauer, Tiefenbach (DE); Lei Yue, Tianjin (CN)

(73) Assignee: Flender GmbH, Bocholt (DE)

( * ) Notice: Subject to any disclaimer, the term of this patent is extended or adjusted under 35 U.S.C. 154(b) by 554 days.

(21) Appl. No.: 17/426,502

(22) PCT Filed: Jan. 28, 2020

(86) PCT No.: PCT/EP2020/051972
§ 371 (c)(1),
(2) Date: Jul. 28, 2021

(87) PCT Pub. No.: WO2020/157027
PCT Pub. Date: Aug. 6, 2020

(65) Prior Publication Data
US 2022/0115920 A1    Apr. 14, 2022

(30) Foreign Application Priority Data
Jan. 29, 2019    (EP) .................................. 19154227

(51) Int. Cl.
*H02K 1/14*     (2006.01)
*H02K 1/18*     (2006.01)
*H02K 7/18*     (2006.01)

(52) U.S. Cl.
CPC ............ *H02K 1/148* (2013.01); *H02K 1/187* (2013.01); *H02K 7/1838* (2013.01)

(58) Field of Classification Search
CPC ........ H02K 1/148; H02K 1/187; H02K 7/1838
(Continued)

(56) References Cited

U.S. PATENT DOCUMENTS

| 3,077,960 A | 2/1963 | Lang |
| 10,125,800 B1 | 11/2018 | Dominguez |

(Continued)

FOREIGN PATENT DOCUMENTS

| CN | 101344074 A | 1/2009 |
| CN | 101764476 A | 6/2010 |

(Continued)

OTHER PUBLICATIONS

International Search Report issued by the European Patent Office in International Application PCT/EP2020/051972 on Apr. 2, 2020.
(Continued)

*Primary Examiner* — Rashad H Johnson
(74) *Attorney, Agent, or Firm* — Henry M. Feiereisen LLC

(57) ABSTRACT

A stator of a directly driven wind turbine generator includes a stator support, and stator segments arranged around a circumference and positioned on flanges of the stator support. Each stator segment includes a segment support having a cavity. Securing devices secure the stator segments via the segment supports to the flanges of the stator support. The securing devices have each an intermediate piece to complement the cavity of a corresponding one of the segment supports, and an alignment pin to secure the intermediate piece in position and to adjust an air gap of the wind turbine generator.

6 Claims, 5 Drawing Sheets

(58) Field of Classification Search
USPC .................................................. 310/89, 91
See application file for complete search history.

(56) References Cited

U.S. PATENT DOCUMENTS

| | | | |
|---|---|---|---|
| 2005/0069382 | A1 | 3/2005 | Atwater et al. |
| 2015/0015124 | A1* | 1/2015 | Rajasingham ......... H02K 9/227 310/58 |
| 2015/0381003 | A1* | 12/2015 | Rajasingham ......... H02K 21/24 310/68 R |
| 2021/0050751 | A1* | 2/2021 | Jensen ..................... H02K 1/16 |
| 2021/0408847 | A1* | 12/2021 | Röer ....................... H02K 1/185 |
| 2022/0103027 | A1* | 3/2022 | Koeszegi ............. H02K 7/1838 |
| 2022/0140715 | A1* | 5/2022 | Mawatari ............... H02K 15/02 310/152 |
| 2023/0220832 | A1* | 7/2023 | Nielsen .................. F03D 13/40 52/300 |
| 2023/0231426 | A1* | 7/2023 | Jensen ................... H02K 1/187 310/216.015 |
| 2023/0383724 | A1* | 11/2023 | Drots ..................... F03D 1/0691 |
| 2024/0026861 | A1* | 1/2024 | Travers ................ F03D 13/205 |
| 2024/0097528 | A1* | 3/2024 | Müller ..................... H02K 1/32 |

FOREIGN PATENT DOCUMENTS

| | | |
|---|---|---|
| CN | 202215416 U | 5/2012 |
| CN | 104838566 A | 8/2015 |
| CN | 108105231 A | 6/2018 |
| EP | 1965086 A1 | 9/2008 |
| EP | 2590301 A1 | 5/2013 |
| EP | 2669531 A1 | 12/2013 |
| EP | 3 352 334 | 7/2018 |
| WO | WO 2018/113863 | 6/2018 |

OTHER PUBLICATIONS

Chinese Search Report issued on Mar. 30, 2023 with respect to counterpart Chinese patent application 2020800116196.
Translation of Chinese Search Report issued on Mar. 30, 2023 with respect to counterpart Chinese patent application 2020800116196.
Chinese Search Report issued on Sep. 4, 2023 with respect to counterpart Chinese patent application 2020800116196.
Translation of Chinese Search Report issued on Sep. 4, 2023 with respect to counterpart Chinese patent application 2020800116196.

* cited by examiner

SECURING OF STATOR SEGMENTS

CROSS-REFERENCES TO RELATED APPLICATIONS

This application is the U.S. National Stage of International Application No. PCT/EP2020/051972, filed Jan. 28, 2020, which designated the United States and has been published as International Publication No. WO 2020/157027 A1 and which claims the priority of European Patent Application, Serial No, 19154227.3, filed Jan. 29, 2019, pursuant to 35 U.S.C. 119(a)-(d).

BACKGROUND OF THE INVENTION

The invention relates to a stator of a directly driven wind turbine and also a method for mounting and positioning stator segments of such a wind turbine.

Because of their diameter of greater than 4 m, stators of directly driven wind turbines are assembled from multiple stator segments, viewed in the circumferential direction. As a rule, these are six, eight or twelve stator segments, which are assembled to form a ring. As a rule, the stator segment is secured at both axial ends. Because of the size of the stator, it is difficult to maintain the required tolerances, During the production of the stator segments and the stator supports, exact fabrication is necessary. Flexible adjustments in the, in particular, radial position relative to one another are not possible. Therefore, the final external diameter depends on exact fabrication of the stator supports and also the stator segments. This requires a great deal of effort on fabrication, which is very costly.

From this starting point, the invention is based on the object of providing a stator which avoids the aforementioned disadvantages and in which, in particular, the air gap of a wind turbine is simple to adjust.

SUMMARY OF THE INVENTION

The set object is achieved by a stator of a directly driven wind turbine generator comprising stator segments arranged around the circumference, each segment being positioned, in particular, on two parallel flanges of a common stator support, wherein each stator segment is secured to the flanges by securing devices, wherein each securing device has an intermediate part, a complimentary cavity on the segment support of the stator segment, and an alignment pin.

The set object is also achieved by a method for positioning and securing stator segments of a stator of a directly driven wind turbine generator by multiple securing points in order to achieve a uniform air gap between the stator and a rotor, by means of the following steps:
  placing a stator segment on a stator support by means of a mounting device,
  adjusting the stator segment on the stator support by means of an intermediate piece in a cavity of the flange support of the stator segment, wherein the intermediate piece and cavity are designed for an accurate fit,
  inserting an alignment pin into the hole in the intermediate piece and an opening in the flange of the stator support so that, by inserting the alignment pin into the axially aligning holes in the intermediate piece and the hole in the flange, radial positioning and securing of the stator element to the flange of the stator support is carried out,
  repeating these steps at further securing points of the stator segment until the required position has been assumed and secured.

Now, to be able to configure in particular the radial positioning of a stator segment flexibly and simply adjustably, according to the invention, flexibilization and adjustability of the cavities of stator segment and stator support, connecting axially to one another, is possible, in particular during the mounting operation. Advantageously, each stator segment is secured to the parallel flanges of the stator support, so that three or four securing points, at which the stator segment is secured to the stator support, are provided for each stator segment.

In principle, the position of the hole in the stator segment is now displaced parallel to the bisector of a stator segment, in order thereby ultimately to displace the complete stator segment radially. This is achieved in particular by an intermediate piece which accurately matches the shape of a cavity provided for the purpose in the flange support of the stator segment. These intermediate pieces have a hole arranged off-center. The cavity in the flange support must be machined exactly, in order to be able to receive the likewise exactly machined intermediate piece, which now accurately defines the position of the securing point of the stator support on and to the stator segment. Therefore, exact machining of the contour of the cavity in the stator segment and also of the external contour of the intermediate piece corresponding thereto, which are congruent, is necessary.

Intermediate pieces with a rectangular, square, round, diamond-shaped or octagonal outline are suitable for this purpose.

The intermediate piece and therefore also the contour of the cavity in the stator segment is point-symmetrical with respect to the center of gravity, so that a rotation of the intermediate piece about the center of gravity leads to a different position of the hole on the intermediate piece and therefore the hole on the stator support.

Ultimately, the overall effort to obtain an exact and possibly simply adjustable air gap is thereby reduced.

The position of the hole on the intermediate piece is therefore off-center. By rotating the intermediate piece about an axis of symmetry extending vertically (relative to the external contour) of the intermediate piece, the position of the stator segment on the stator support can be raised and lowered by the offset of the hole center relative to the center of the intermediate piece.

Furthermore, during the mounting process, there are now multiple such intermediate pieces matched to the contour of the cavity with differently arranged holes, from which a choice is made in order to be able to perform exact positioning of the stator segment on the stator support.

BRIEF DESCRIPTION OF THE DRAWINGS

The invention and further advantageous refinements of the invention will be explained in more detail by using exemplary embodiments illustrated in principle, Here.

DETAILED DESCRIPTION OF PREFERRED EMBODIMENTS

Figure 1:
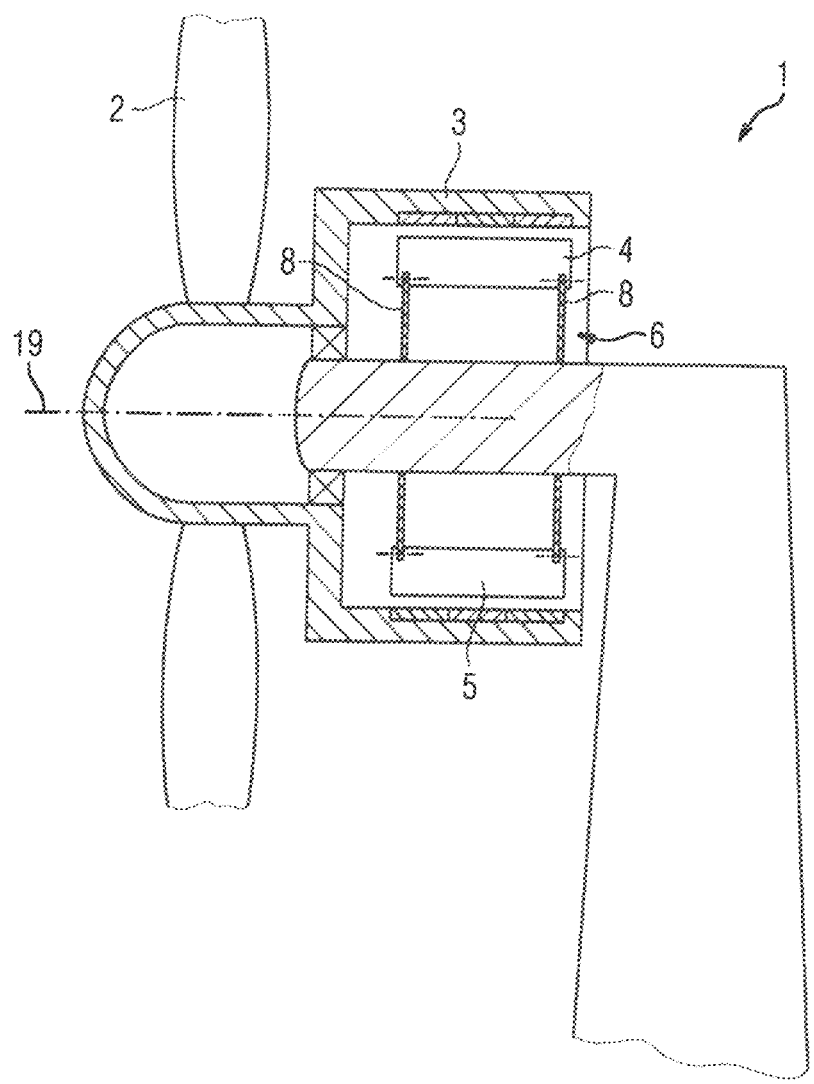
FIG. 1 shows a basic wind turbine.

FIG. 1 shows a basic illustration of a directly driven wind turbine generator having an external rotor. The rotor 3 has permanent magnets, not specifically illustrated, which interact electromagnetically with a winding system of a stator 4, not specifically shown in this illustration, and thus provide electrical energy on the basis of the rotation of the wind turbine of the wind turbine 1. The stator 4, viewed in the circumferential direction, is divided into stator segments 5, which are each supported on flanges 8 of a stator support 6 which, in this embodiment, has two parallel flanges 8.

Figure 2:
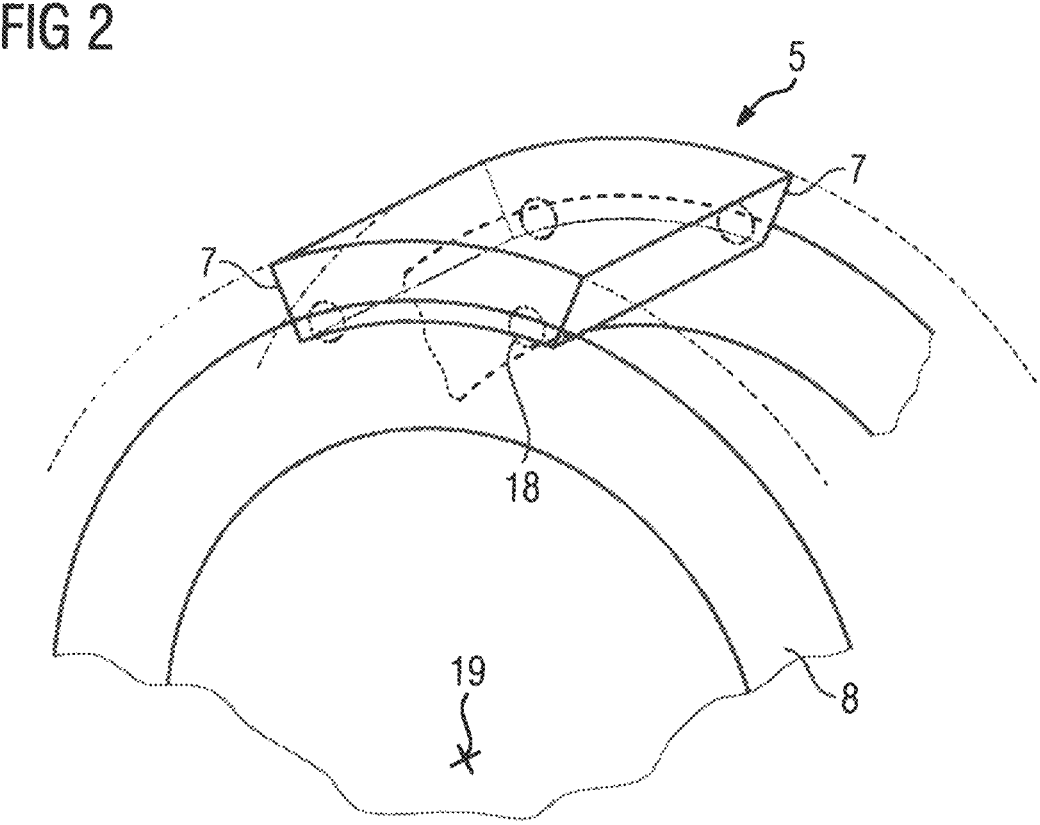
FIG. 2 shows a detail of a stator segment on a stator support.

As FIG. 2 shows in more detail, a stator segment 5 having four securing points 18 in this illustration is fixed to the flanges 8 of the stator support 6 by means of a suitable securing device, as will be described in more detail below.

Figure 3:
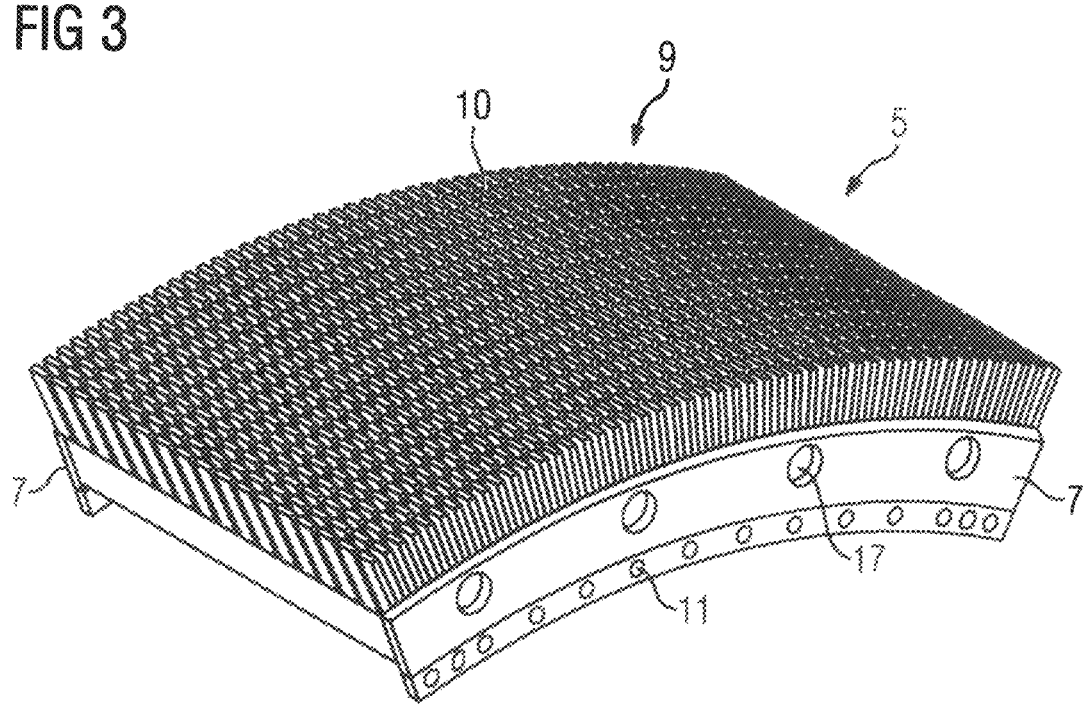
FIG. 3 shows a stator segment.

A stator segment 5 has a laminated core 9 which has axially parallel grooves 10, in which a winding system, not specifically illustrated, is arranged and secured. This laminated core 9 is axially delimited and held together by segment supports 7. Via the segment supports 7, which have cavities 11 in their radially inner region, a stator segment 5 is now secured to the stator support 6 and the flanges 8, FIG. 3 shows a perspective illustration of a stator segment 5 without a winding system but with segment supports 7 which are provided with multiple cavities 11. The segment supports 7 package and secure the laminated core 9 of the stator segment 5. Further larger cavities or apertures 17 in the segment support 7 permit the passage of cooling air during the operation of the wind turbine 1, in order to cool the stator 4.

Figure 4:
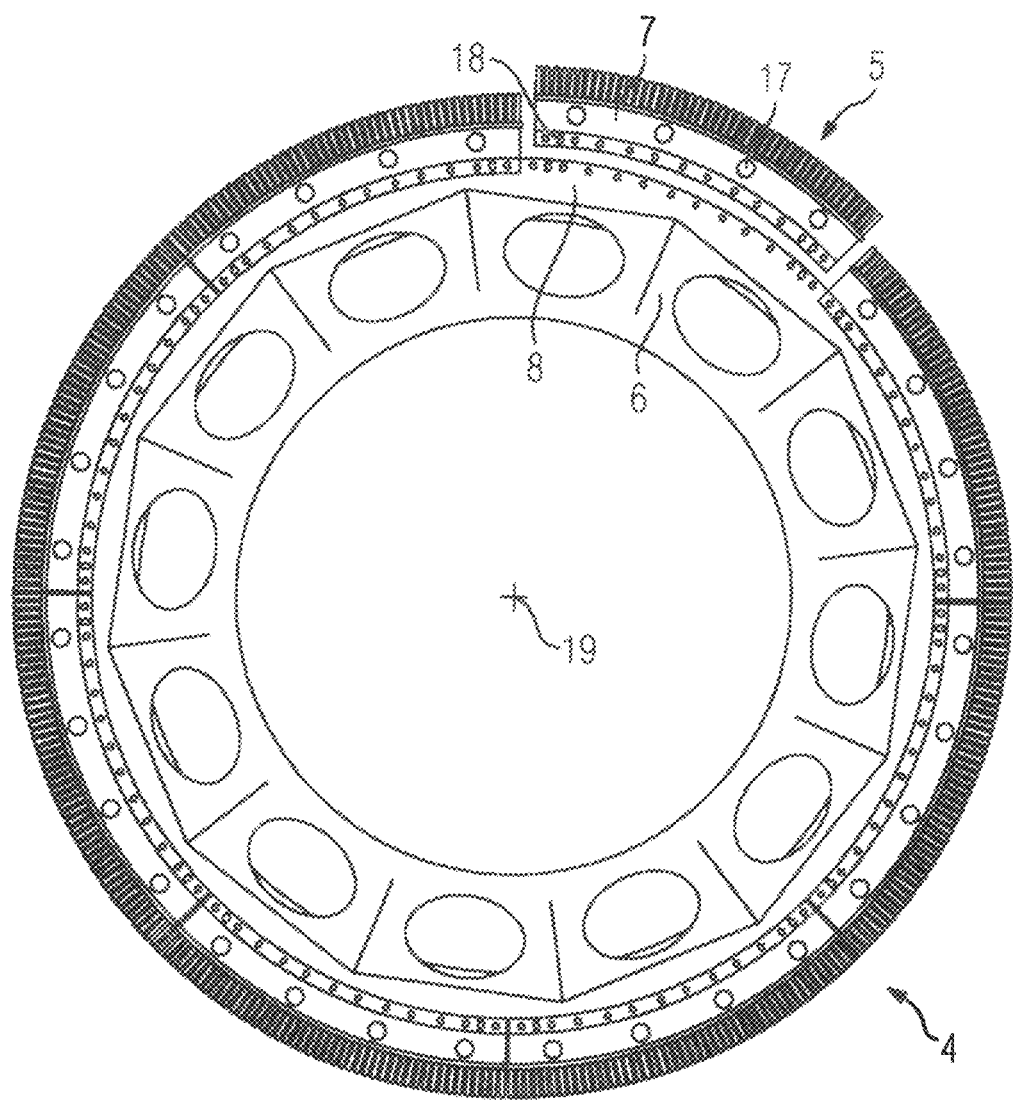
FIG. 4 shows a method of producing a stator, illustrated in principle.

FIG. 4 shows in principle how the stator segments 5 are secured and aligned relative to one another on a stator support 6 by means of connections of the flange of the stator support 6 and the flange 8 of the stator segment 5. For reasons of clarity in the drawing, the winding system in the groove has been omitted. The stator segments 5 are preferably placed radially on the stator support 6, then aligned and secured over the securing points 18 by means of securing devices.

Figure 5:
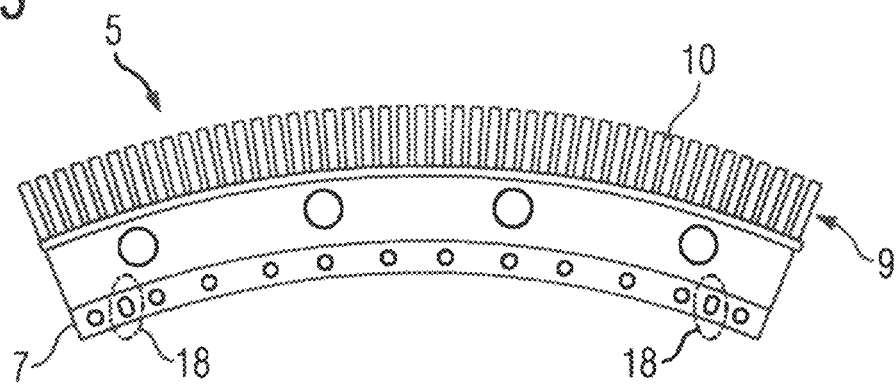
FIG. 5 shows a further stator segment with flange.

FIG. 5 shows a side illustration of a more detailed view of a stator segment 5, which shows a laminated core 9 having grooves 10 not yet occupied by the winding system. Furthermore, FIG. 5 shows the radially inwardly facing sections of the segment support 7, via which the stator segment 5 is secured on the stator support 6 at the predefined securing points 18.

Figure 6:
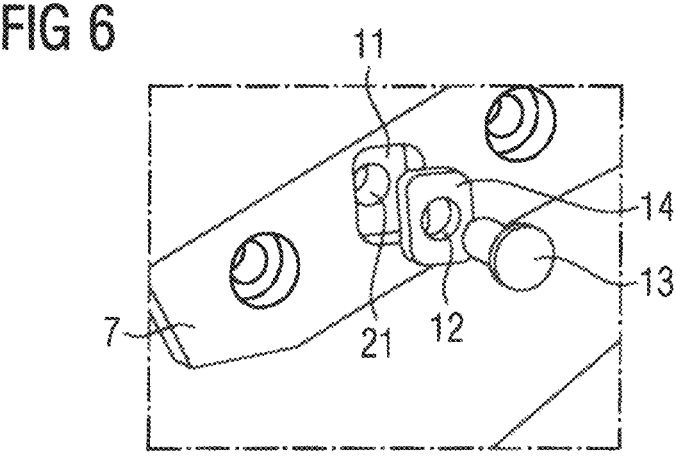
FIG. 6 shows a securing point.

FIG. 6 shows a detailed illustration of a securing point 18, wherein the securing device has multiple parts. Firstly, the cavity 11 of the segment support 7, which has been produced with the closest possible tolerances with respect to the contour and into which an accurately fitting intermediate piece 14 can be inserted, which must likewise be machined exactly to shape. The intermediate piece 14 has a center of a hole which is arranged off-center, so that by rotating this intermediate piece 14 in a plane parallel to the flanges 8, it is made possible to displace the stator segment 5 in the plane of the flange 8.

Figure 8:
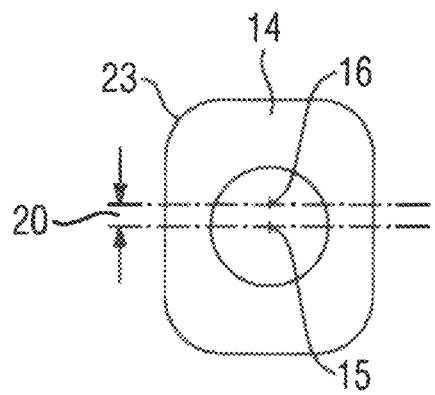
FIG. 8 shows a rectangular intermediate piece.
Figure 9:
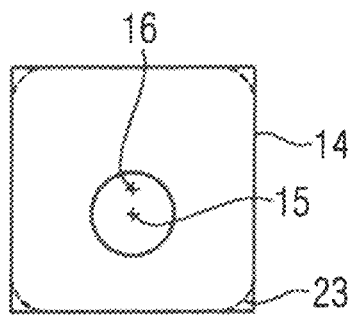
FIG. 9 shows a square intermediate piece.
Figure 10:
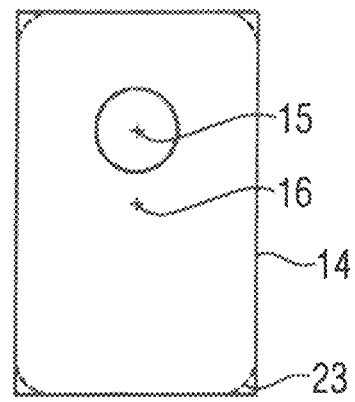
FIG. 10 shows a further rectangular intermediate piece.
Figure 11:
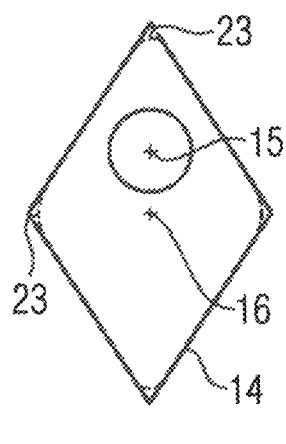
FIG. 11 shows a diamond-shaped intermediate piece.
Figure 12:
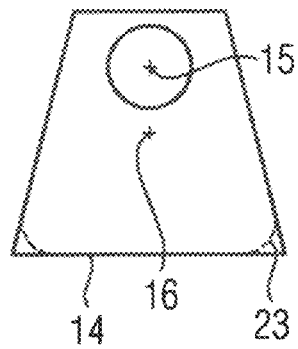
FIG. 12 shows a trapezoidal intermediate piece.
Figure 13:
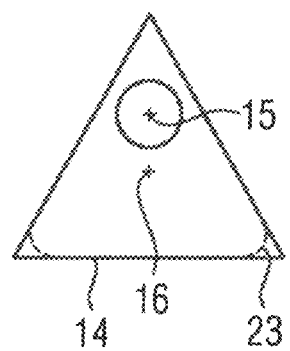
FIG. 13 shows a triangular intermediate piece.
Figure 14:
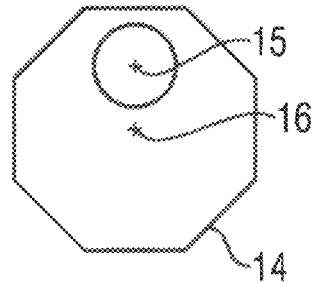
FIG. 14 shows an octagonal intermediate piece.
Figure 15:
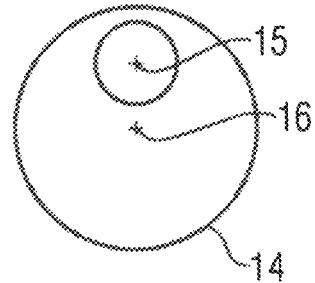
FIG. 15 shows a round intermediate piece.

As illustrated in more detail in FIG. 8, the intermediate piece 14 has a hole 23, the center 15 of which has an offset 20 with respect to the center 16 of the intermediate piece 14.

By means of a mounting aid of the stator segments 5, the stator segment 5 is raised or lowered and the intermediate piece 14 is secured in an accurate position by means of the alignment pin 13. By rotating the intermediate piece 14 through 180 about the center 16, the segment support 7 can be positioned with a radial offset at a securing point 18.

By choosing intermediate pieces 14 which have identical contours with a different offset 20 at a securing point, the segment support 7 can be positioned radially accurately, and therefore the air gap of a wind turbine generator can be adjusted exactly. Likewise, this procedure is followed at the other securing points 18 of this segment support 7.

Figure 7:
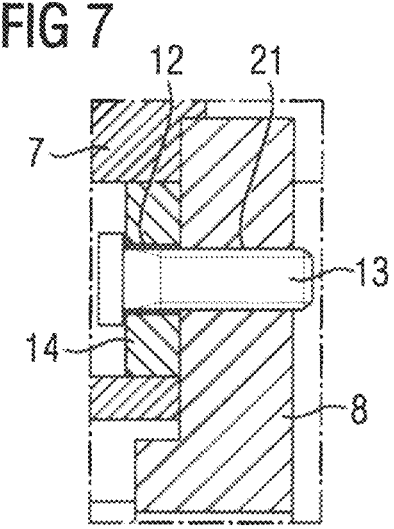
FIG. 7 shows a longitudinal section of the securing point.

According to the above steps, this procedure is now followed at the other securing points 18 of the further stator segments 5. In the process, for example as illustrated in FIG. 7, the intermediate piece 14 is aligned by a mounting device, not specifically illustrated, in such a way that the hole 12 of the intermediate piece 14 and the hole 21 in the flange 8 of the stator support 6 are aligned axially. An alignment pin 13 has a slight oversize with respect to the hole 12 in the intermediate piece 14 and the hole 21 in the flange 8, so that exact positioning and alignment by means of the mounting device, and therefore an exact air gap, can be adjusted and secured in an accurate position by means of the securing device.

FIG. 9 to FIG. 15 show further intermediate pieces 14, of which the respective contour in the segment support 7 must substantially correspond, in order to position the segment support 7 and therefore the stator segment exactly. By respective rotation of the intermediate pieces 14 through 180° about the center 16, a variation in the mounting is already possible in the respective intermediate pieces 14. Rounded portions 23 of the corner points of the respective intermediate pieces 14 do not impair the positioning.

The offset 20 between the center 15 and the center 16 of the intermediate piece 14 is to some extent illustrated exaggeratedly in FIGS. 9 to 15. The offset 20, as also illustrated in FIG. 8, moves in the range from 0.1 mm to a few millimeters.

The inventive idea can also be implemented in a stator support 6 having only one flange, in this case, the stator segment 5 then has only one segment support arranged substantially centrally in relation to the stator segment 5.

The invention claimed is:

1. A stator of a directly driven wind turbine generator, said stator comprising:
   a stator support including flanges;
   stator segments arranged around a circumference and positioned on the flanges, each of the stator segments including a segment support having a cavity; and
   securing devices configured to secure the stator segments via the segment supports to the flanges of the stator support, said securing devices each including an intermediate piece to complement the cavity of a corresponding one of the segment supports, and an alignment pin to secure the intermediate piece in position and to adjust an air gap of the wind turbine generator.

2. The stator of claim 1, wherein the stator has two of said flanges extending in parallel relation.

3. The stator of claim 1, wherein the securing device is provided on an outer region of the stator segment.

4. The stator of claim 1, wherein the securing devices have each a plurality of said alignment pin arranged in axially parallel relation.

5. The stator of claim 1, wherein each of the flanges of the stator support has an opening, said alignment pin configured with an oversize with respect to the opening in the flange.

6. A method for positioning and securing a stator segment of a stator of a directly driven wind turbine generator, said method comprising the steps of:
- a) placing the stator segment on a stator support using a mounting device;
- b) adjusting the stator segment on the stator support and inserting an intermediate piece into a complementary cavity of a segment support of the stator segment to effect an accurate fit of the intermediate piece in the cavity;
- c) inserting an alignment pin into a hole in the intermediate piece and an axially aligned opening in a flange of the stator support to thereby radially position and secure the stator element to the flange of the stator support; and
- d) repeating steps a) to c) at further securing points of the stator segment and securing points of further stator segments until a required position of the stator segments has been realized and secured and an air gap between the stator and a rotor of the wind turbine generator has been adjusted.

* * * * *